May 3, 1927.
E. H. LICHTENBERG
1,626,680
DRIVE MECHANISM FOR TRACTORS
Filed March 2, 1921   3 Sheets-Sheet 3
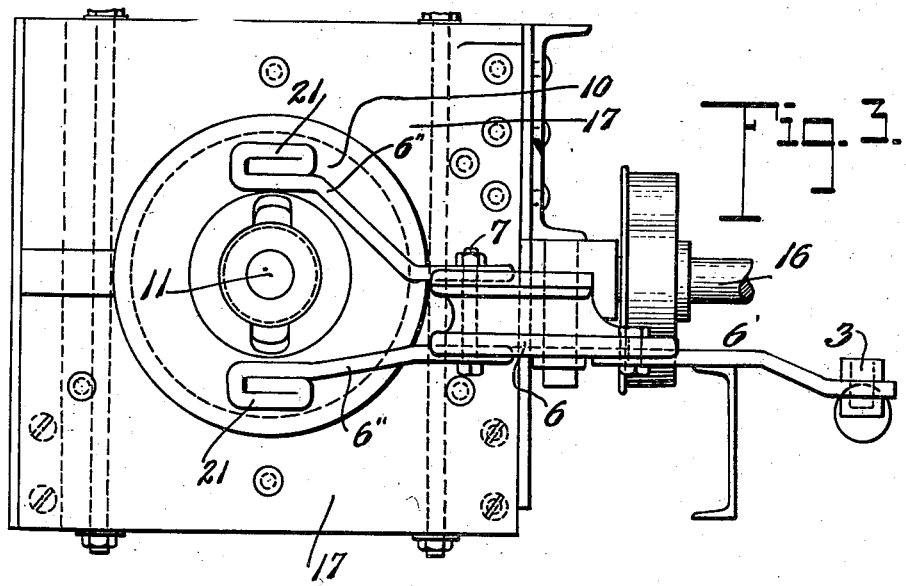
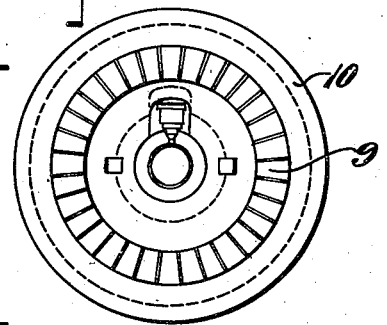
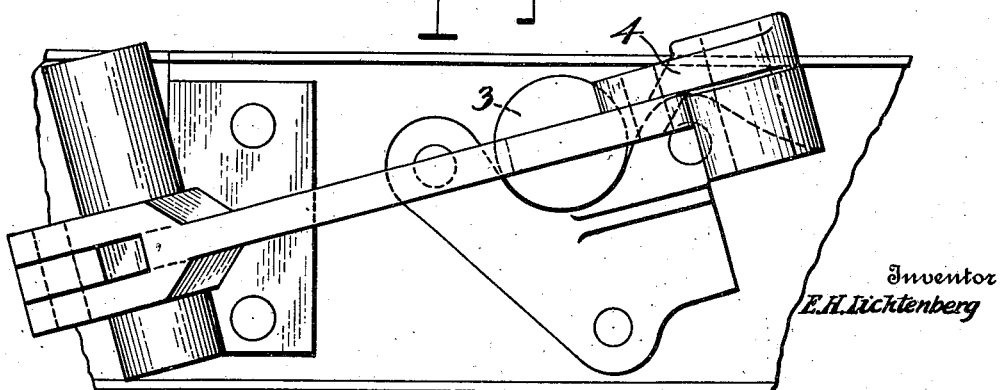
Inventor
E.H. Lichtenberg Patented May 3, 1927.

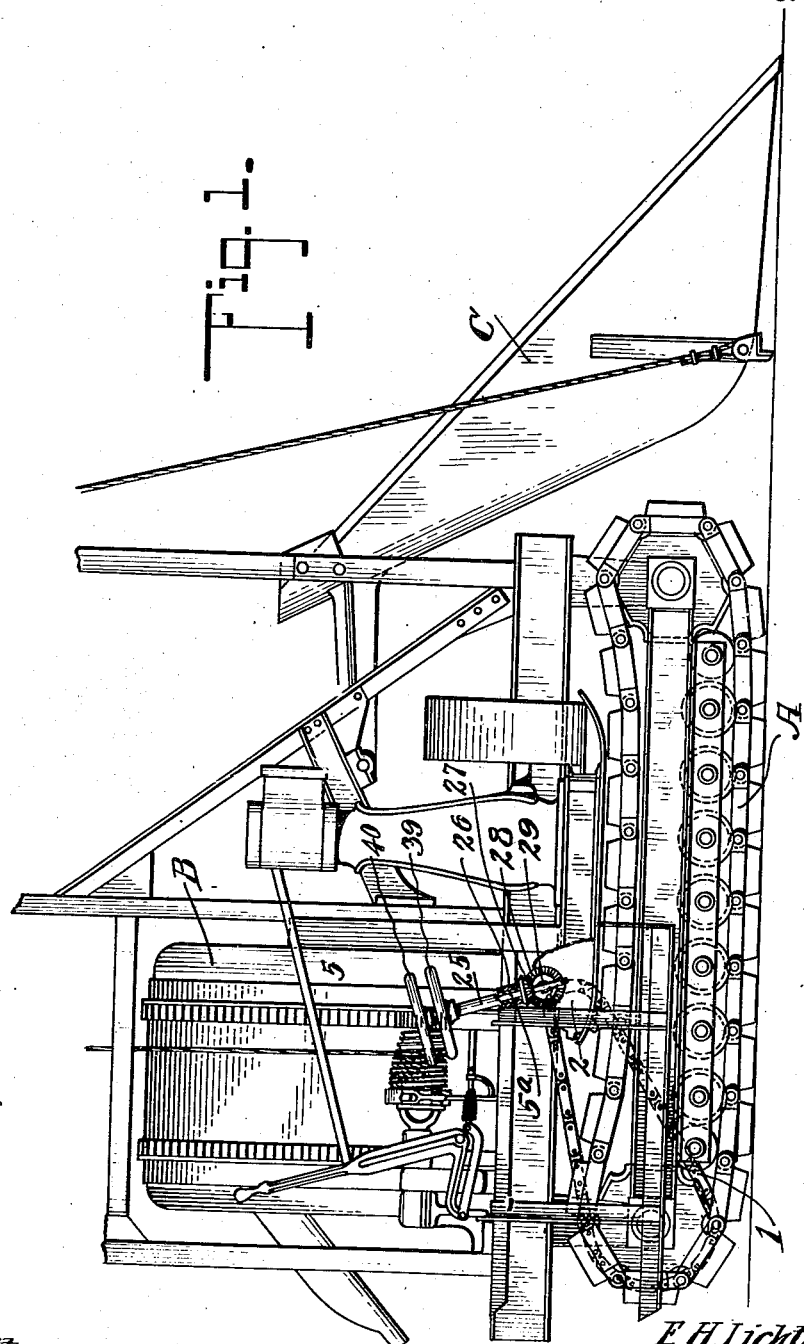

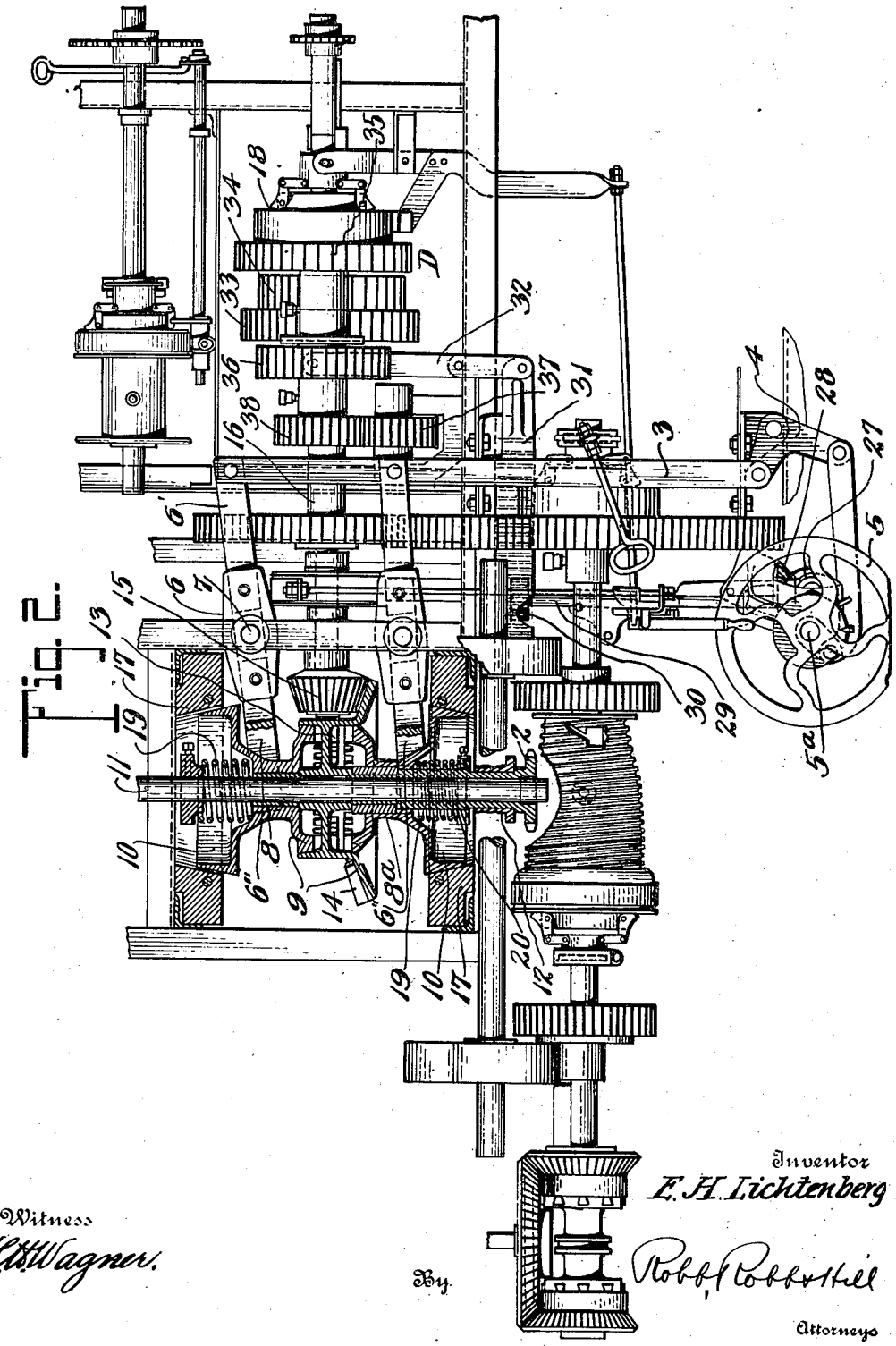

1,626,680

UNITED STATES PATENT OFFICE.

ERICH H. LICHTENBERG, OF MILWAUKEE, WISCONSIN, ASSIGNOR, BY MESNE ASSIGNMENTS, TO KOEHRING COMPANY, OF MILWAUKEE, WISCONSIN, A CORPORATION OF WISCONSIN.

DRIVE MECHANISM FOR TRACTORS.

Application filed March 2, 1921. Serial No. 448,996.

The improvements of this invention have to do primarily with traction means designed for large and heavy vehicles of different types. The most efficient traction means employed in the arts to-day for heavy machines and vehicles, paving machines, machines of different kinds, is known to be the endless traction type. One of the problems of operation of this type of traction means is to secure an effective control thereof to handle the machine or vehicle equipped therewith, with the greatest facility.

The essential object of this invention therefore has been to design a drive mechanism for traction devices of the endless track type, which drive mechanism is of especially simple design, constructed to effectively perform the heavy work entailed in its operation, adapted to be very readily operated to vary the control action thereof with respect to the endless tracks driven thereby, and advantageous otherwise from the viewpoint of economy of space occupied, etc., as will be more fully apparent upon reference to the following description in conjunction with the annexed drawings, in which—

Figure 1 is a side elevation of a large type concrete mixing machine equipped with the traction device and drive mechanism of the invention;

Figure 2 is a plan view showing a large number of the general operating mechanisms carried by the frame work of the machine, including the change speed gears, hoisting drum, brake appliances, and the like, the drive mechanism of the invention being also clearly illustrated with its parts shown largely in section for the purpose of clearness;

Figure 3 is a view showing in elevation the peculiar type of shifting yoke for the combined clutch member and brake drum, with certain actuating parts, the relation of the yoke to the drum being clearly illustrated;

Figure 4 is a sectional view showing the relation of the teeth of the double clutch member and the single clutch member, when engaged;

Figure 5 is an end view of one of the combined clutch and brake members, looking toward the clutch element thereof; and Figure 6 is a view largely in elevation showing the actuating contrivances of the main operating bar to which the shifting levers are operated.

It is to be understood that the particular type of traction device, designated A in Figure 1, is not material to the invention so far as specific structure is concerned. Said device may be any ordinary efficient operating traction device or endless track. The traction device A is driven from a propeller shaft on the machine, to be later designated, by suitable gearing including a driving sprocket chain 1 and a sprocket gear 2. The type of machine which is illustrated in Figure 1 is not material to the invention because the drive mechanism thereof may be used in connection with many classes of heavy traction machines. In Figure 1 B denotes the mixer and C the loading skip therefor.

Referring now to Figure 2, the change speed gearing is illustrated at D and is preferably controlled in a suitable manner. It will be observed that an operating bar 3 extends transversely on the frame of the machine and is connected at one end to a bell crank lever 4 which in turn is connected with a wheel 5 by a suitable shaft $5^a$ mounted in a hollow shaft 25 supported in the steering column 26 of the machine. In this way I provide a simple and effective main operating means for controlling the driving device interposed between the main drive shaft of the engine and the traction devices A.

The operating bar 3 is connected to a pair of shifting levers 6 which are shown best in Figure 3 of the drawings. These levers comprise central castings pivoted at 7 to the frame-work of the machine, a front arm 6' pivotally connected with the bar 3 and a pair of shifting arms 6" extending rearwardly from the casting aforesaid and constituting a yoke cooperative with one of an adjacent pair of combined clutch and brake members.

The clutch and brake members 8 and $8^a$ are best seen in Figure 2 as consisting of a central body portion, an end clutch member 9 equipped with suitable clutch teeth and an opposite end brake drum 10. The clutch and brake member 8 is directly mounted on the propeller shaft 11, being keyed or otherwise fixed for rotation with said shaft. The clutch member $8^a$ however is mounted upon a propeller sleeve 12 which in turn is loose upon the propeller shaft 11. The propeller sleeve 12 carries the driving sprocket gear 2, mentioned before as cooperating with the sprocket chain 1, for driving the traction device A. The gear 2 is located practically at one end of the shaft 11 for the driving of one of the endless tracks A, and the shaft 11 will have at its other end, directly secured thereto, a corresponding gear, not illustrated, for the other endless track A, two of which are usually provided on heavy machines or vehicles of the class, before referred to.

Located intermediate the two clutch and brake members 8 and 8ª is a double clutch member 13 having opposite clutch teeth for cooperation with those of the members 8 and 8ª. Additionally the double clutch member 13 is equipped with a bevelled gear 14 adapted to mesh with a driving pinion 15 on the main drive shaft 16 which leads forward to the engine or motor by which the traction machine is operated.

The clutch and brake members 8 and 8ª are splined upon the shaft 11 and sleeve 12 respectively so they are free to slide longitudinally a slight distance sufficient to disengage the clutch teeth from those of the double clutch member 13, and additionally sufficient to engage the cone brake drums 10 with the wooden brake shoes 17 which are situated for cooperation with the said brake drums 10. The shoes 17 are preferably made of wood, though their construction may be modified to meet the requirements of service.

The double clutch and gear member 13 is mounted loosely on the propeller shaft 11 and is constantly driven by the drive pinion 15 so long as the engine shaft is connected to the drive shaft 16, through the medium of a suitable clutch 18 or the like. It will be apparent that under normal conditions certain springs 19 arranged between set collars 20 on the shaft 11 and sleeve 12 on one hand, and the brake drums 10 on the other hand, tend to hold the two clutch and brake members 8 and 8ª in positions wherein their clutch elements 9 engage the corresponding elements of the double clutch member 13. Under these conditions, it will be evident that the propeller shaft 11 and the propeller sleeve 12 will be driven in the same direction whether forwardly at any one of several speeds, or rearwardly under the control of the reverse gearing of the change speed mechanism. When thus driven the traction devices operated from the shaft 11 and the sleeve 12 are driven correspondingly in the same direction and at the same velocity. Should it be desired to discontinue the drive on one of the traction devices A, while maintaining the drive on the other, as for turning purposes, this may be done by merely shifting the operating bar 3 longitudinally to disengage one of the clutch elements 8 and 9 from the double clutch member 13, whereupon the drive controlled by such disengaged clutch element will be discontinued.

If a positive retardation or stopping of the operation of one traction device A is desired or required, dependent upon the particular conditions of use of the machine, or the peculiarity of the surface over which the machine is travelling, the desired result may be effected by an operation of the bar 3 not only to shift one of the clutch elements 8 and 9 from engagement with respect to the double clutch member 13, but a sufficient movement will be imparted to said clutch element to carry its associated brake drum 10 into a greater or less cooperation with the adjacent shoe 17. In this way a positive braking of any movement whatever of the particular traction device controlled may be effected to compel stoppage thereof. This last action is desirable when the nature of the ground is such that the turning action would result in too much friction. The non-driven traction device would then be dragged along and the machine would continue an approximately straight course. By throwing in the brake drum for such traction device the above dragging of the latter is prevented. The cooperation of the brake drums 10 with the clutch elements 8 and 9 enables the simultaneous disengagement of either clutch element and engagement of its brake means. This makes for a very simple and effective operation and control.

It is notable that I form the arms 6″ of the lever 6 in a peculiar manner shown best in Figure 3. These arms are provided with relatively large bearing surfaces or lugs 21 adapted to bear on the brake drums and gear elements of each member 8 and 8ª for the purpose of shifting the said gear members, and for the additional purpose of supplying a considerable amount of friction between the parts 10 and 21 with the result of a somewhat added braking effect being obtainable combined with that incident to the cooperation of the brake drums 10 with the shoes 17.

Passing now to the change speed gearing feature of my driving mechanism it is noted that the hollow shaft 25, previously described as carrying therein the steering shaft 5ª, carries at its lower end a bevel gear 27 which meshes with a corresponding bevel gear 28 mounted on a horizontal shaft 29 extending inwardly from the steering control wheel and adjacent parts. On the inner end of the shaft 29 is a pinion 30 which meshes with a horizontal rack 31 extending at substantially right angles to the shaft 29. The rack 31 is connected by a lever 32 with the sliding gears 33 and 34 of the change speed mechanism. It will be evident that by a shifting of the lever 32 under the actuation of the rack 31 the gears 33 and 24 may be caused to engage in the well known manner with the proper gears 35 and 36 which are high and low speed gears respectively, or the gear 33 may be caused to mesh with the idler gear 37 which engages the reverse gear 38 on the drive shaft 16.

At its upper end the hollow shaft 25 has fixed thereto the gear shifting hand wheel 39, said wheel being located adjacent to the handwheel 5 so as to enable the operator to quickly control both the steering and the shifting mechanism from his location where he controls the general operation of the entire machine.

On the upper portion of the shaft 25 may be supplied a dial equipped with indicia indicating high, low, neutral, and reverse speed adjustments of the wheel 39.

It is evident that the hand wheels and their supporting shafts with the actuating parts to which the shafts are connected represent a control unit for changing the speed of the machine, and varying the direction of movement, which is very advantageous from a practical viewpoint.

Having thus described my invention, what I claim as new and desire to secure by Letters Patent is:

1. Drive mechanism of the class described, comprising a propeller shaft, a propeller sleeve on said shaft, a combined clutch and brake member keyed to the shaft, a combined clutch and brake member keyed to the sleeve, a clutch member cooperative with the clutch elements of said combined clutch and brake members and comprising a double faced device formed with a gear, a driving gear meshing with the aforesaid gear, shoes with which the brake elements of the combined clutch and brake members are adapted to engage, means for shifting either of the combined clutch and brake members from engagement with said double faced clutch member, and to cause engagement of the brake element thereof with its brake shoe.

2. Means substantially as claimed in claim 1 wherein said shifting means comprises an operating bar, a pair of levers connected with said bar and pivoted intermediate their ends, said levers being connected with the combined clutch and brake members, and the propeller shaft forming an axis for said combined clutch and brake members and the double faced clutch member, the shifting levers furthermore having friction elements intermediate the same and the combined clutch and brake members, together with springs which normally tend to hold the brake elements of the combined clutch and brake members engaged with the clutch element.

3. In drive mechanism of the class described, in combination, traction devices for propelling a machine, a drive shaft, a propeller shaft tranverse to the drive shaft, change speed mechanism for controlling operation of the drive shaft at different speeds, a driving pinion on said drive shaft, a double clutch member loose on the propeller shaft and provided with a gear element engaging said driving pinion of the drive shaft, a pair of combined clutch and brake members at opposite sides of said double clutch member and having clutch elements to engage the corresponding clutch elements of the clutch member, the combined clutch and brake members being coaxial with the propeller shaft, springs normally pushing the combined clutch and brake members toward one another and thereby into engagement with the double clutch member, brake parts cooperative with the brake members of the combined clutch and brake members and located also at opposite sides of the double clutch member, and a two direction actuating lever mechanism for moving the combined clutch and brake members to disengage the clutch element of each from the double clutch member and to control the brake member of each in relation to its adjacent brake part.

4. In a drive mechanism of the class described, in combination, a main drive shaft, two traction device driving members cooperative therewith, clutch and brake means for connecting the drive shaft to either or both of said traction device driving members for operating the latter at a predetermined speed or braking the same, change speed mechanism for the drive shaft, and a single mechanism for the drive shaft, and a single control unit embodying manual means for controlling the action of said clutch mechanism to cause disengagement of the clutch means for either driving member and apply the brake means thereto and manual means for controlling the action of the change speed mechanism substantially as set forth, the first manual means comprising a wheel, levers for operating the clutch mechanism and connections between the wheel and said levers, and the second manual means comprising a wheel coaxial with the first mentioned wheel and operatively connected to the said change speed mechanism.

In testimony whereof I affix my signature.

ERICH H. LICHTENBERG.